United States Patent [19]

Panisset et al.

[11] Patent Number: 4,779,096

[45] Date of Patent: Oct. 18, 1988

[54] PROCESS AND DEVICE FOR LIMITING TRAFFIC TO BE USED WITH AN INTERROGATION/RESPONSE SYSTEM SUCH AS A SECONDARY RADAR OR IFF SYSTEM

[75] Inventors: Daniel Panisset, Maisons Laffitte; Alain Loaec, Villepreux, both of France

[73] Assignee: LMT Radio Professionnelle, Boulogne Billancourt, France

[21] Appl. No.: 848,568

[22] Filed: Apr. 7, 1986

[30] Foreign Application Priority Data

Apr. 9, 1985 [FR] France .................. 85 05335

[51] Int. Cl.⁴ .............................. G01S 13/74
[52] U.S. Cl. ...................... 342/37; 342/45; 342/51
[58] Field of Search .......... 342/29, 30, 32, 36-45, 342/50, 51, 187

[56] References Cited

U.S. PATENT DOCUMENTS 2,923,935  2/1960  Sinclair et al. .......... 342/187
3,875,570  4/1975  Litchford ................ 342/37
4,174,519  11/1979  Poli ...................... 342/40

FOREIGN PATENT DOCUMENTS 2407487  5/1979  France .

OTHER PUBLICATIONS

Milosevic, "Radar Secondaire De Surveillance Ä Reponses Stochastiques"; *L'onde Electrique*, (1979; vol. 59, No. 10; pp. 84-90).

Primary Examiner—Theodore M. Blum
Assistant Examiner—Bernarr E. Gregory
Attorney, Agent, or Firm—Oblon, Fisher, Spivak, McClelland & Maier

[57] ABSTRACT

The process for limiting traffic according to the invention comprises an AND input gate receiving the incident pulses representative of the interrogations of the system, its output being connected to an authorization output as well as to a counter which is itself connected to an adder and to a counter, the adder receiving from a memory criteria values, and its output being connected via a reference values memory to the comparator, the output of which is connected via a memory to the said AND gate.

8 Claims, 6 Drawing Sheets

FIG_1
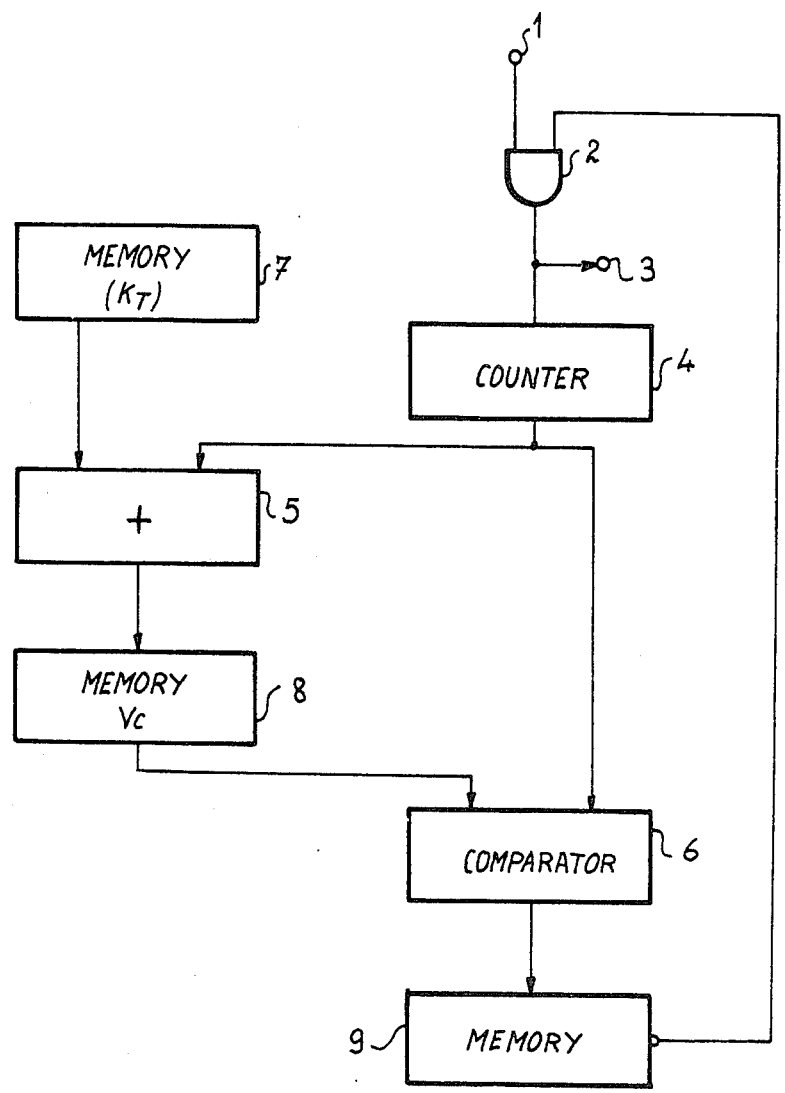

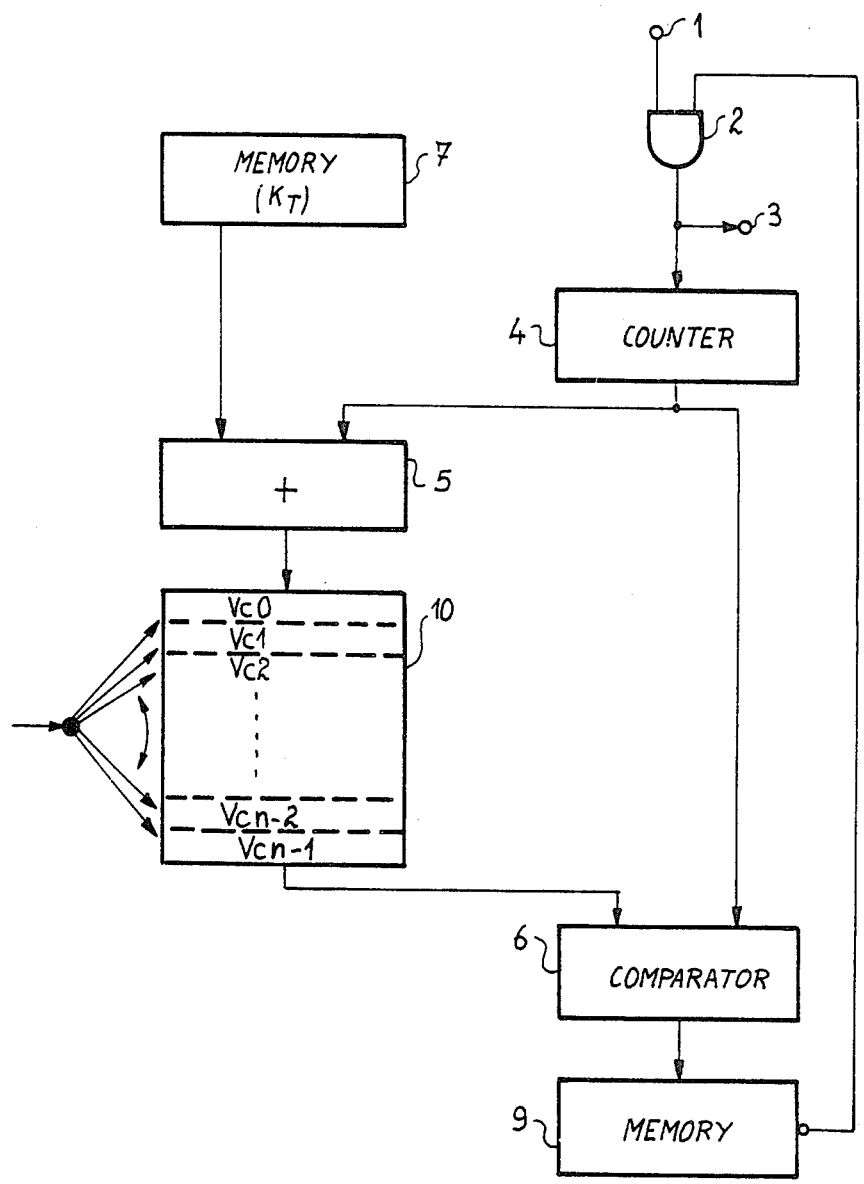
FIG_2

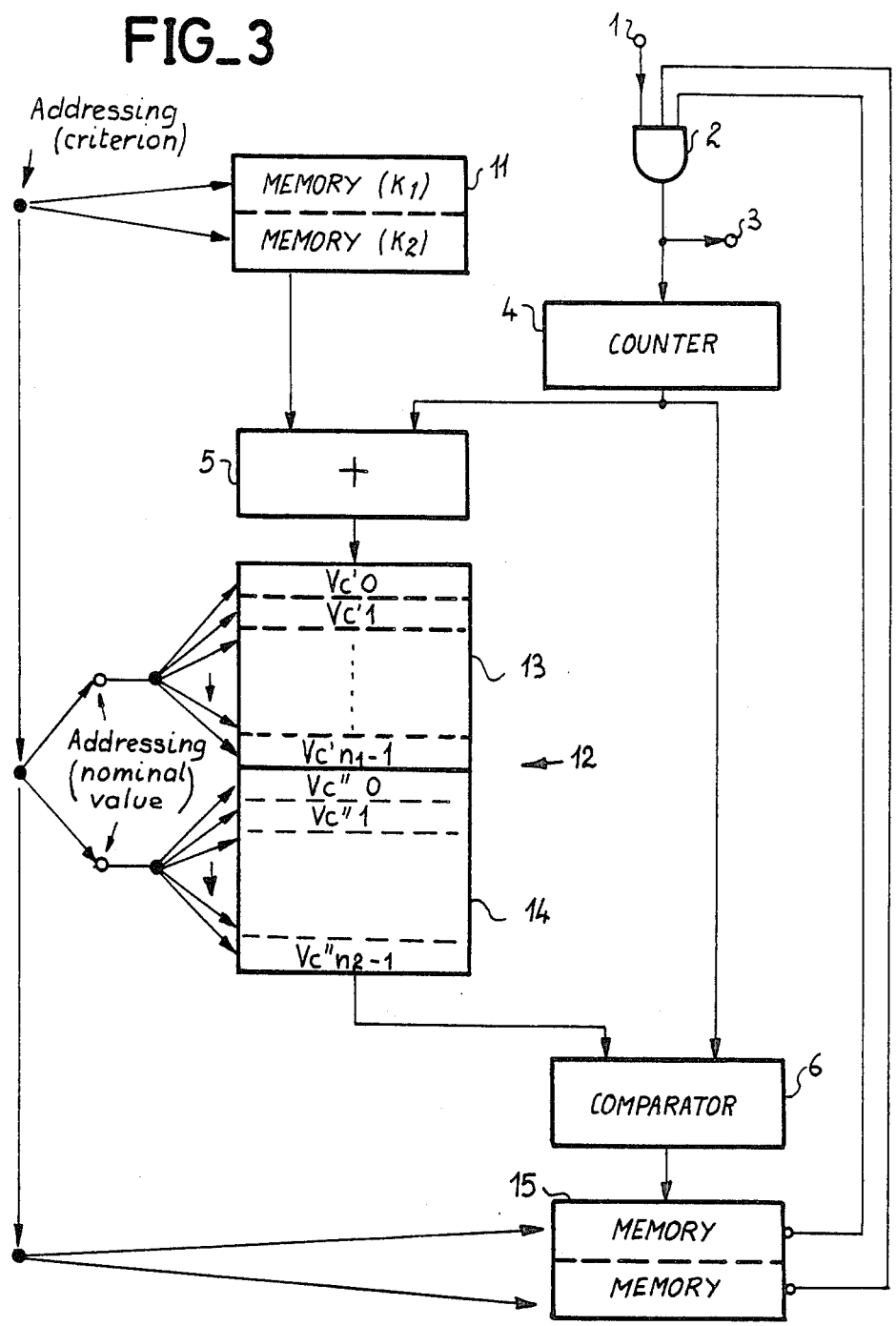

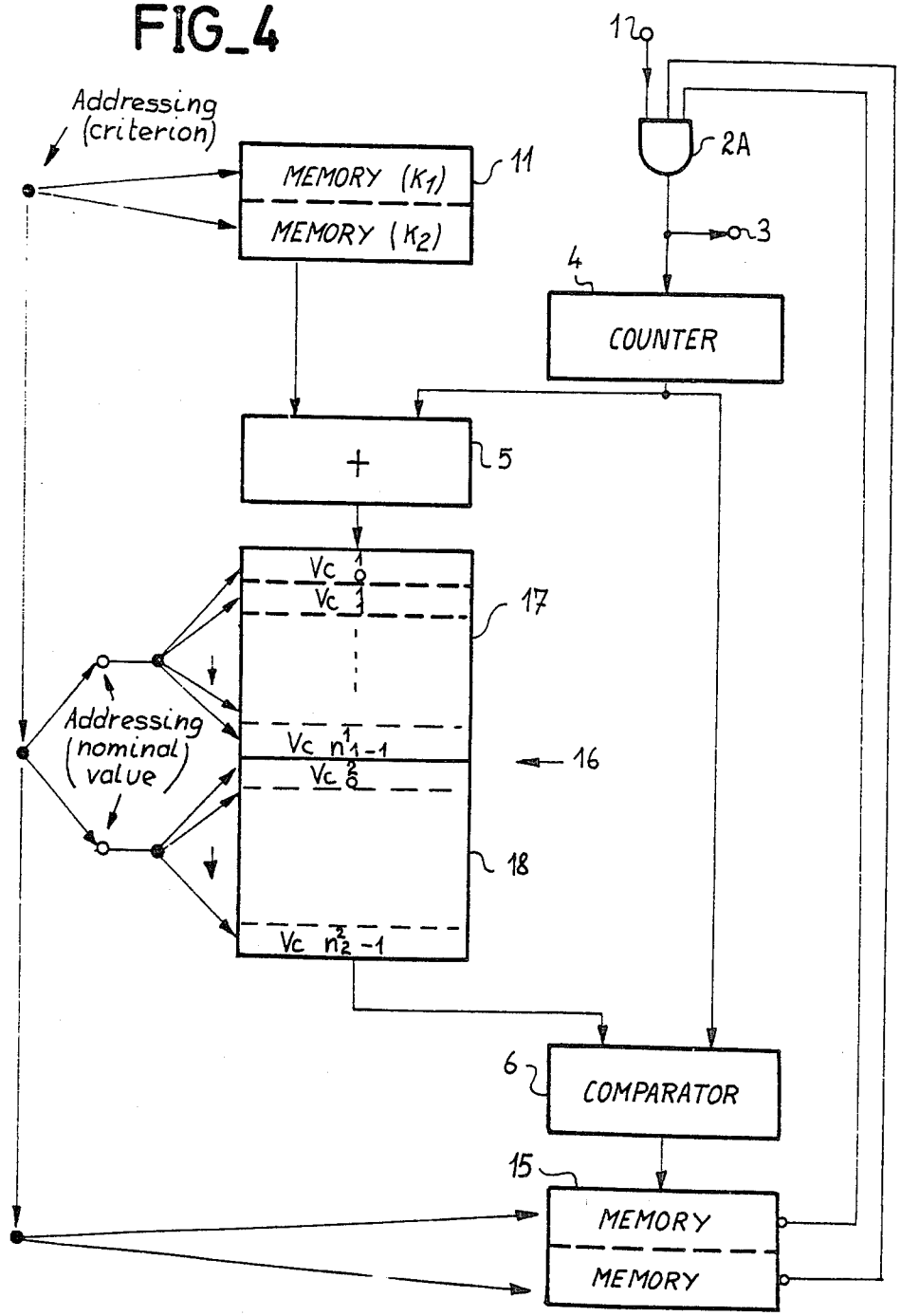

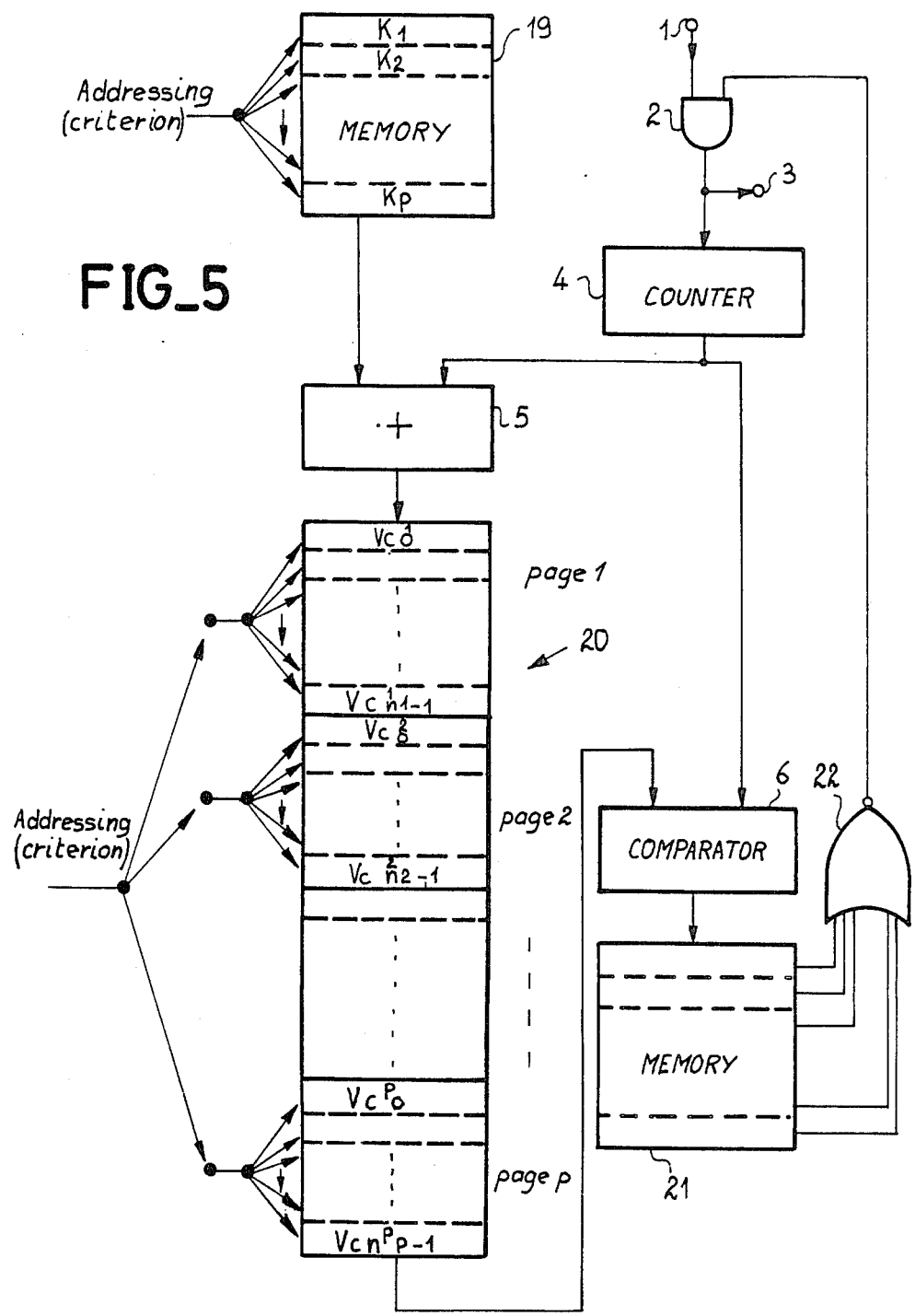
FIG_5

FIG_6
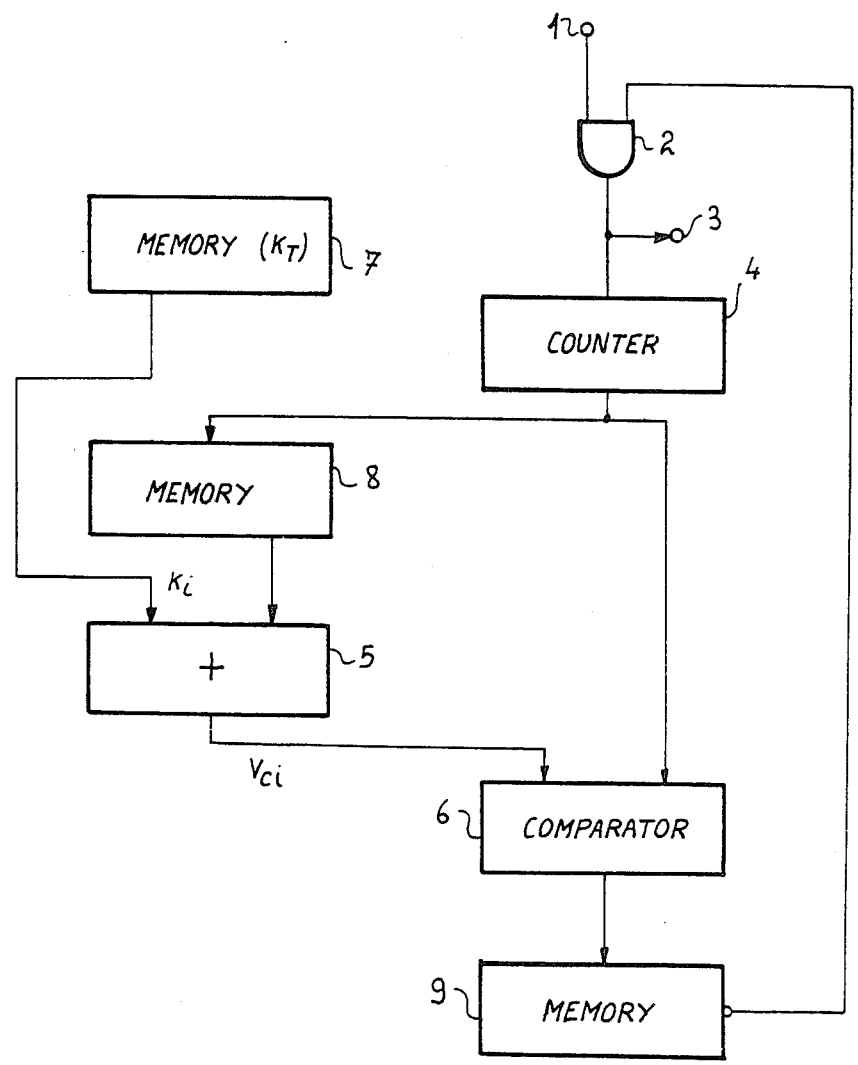

PROCESS AND DEVICE FOR LIMITING TRAFFIC TO BE USED WITH AN INTERROGATION/RESPONSE SYSTEM SUCH AS A SECONDARY RADAR OR IFF SYSTEM

BACKGROUND OF THE INVENTION

1. Field of the Invention

The present invention concerns a process and a device for limiting traffic intended to be utilized with an interrogation/response system such as a secondary radar or an IFF system.

2. Description of the Prior Art

In an interrogation/response system, a movable carrier platform of a transponder can be consulted at the same moment by a certain number of interrogating stations based either on the ground or on other platforms. If the number of interrogations produced within a short period of time is too high, they loose all intelligibility through mutual interference, and too many responses over-load the transponder transmitter.

According to the prior art, this problem is overcome by desensitizing the transponder receiver through means analog to an automatic gain control, so as to eliminate the interrogations according to a receiving level criterion, it being presumed that the weakest issue from the furthest interrogating stations, thus the least concerned by the presence of the movable platform within their surveillance zone.

The present invention concerns a process and a device for the limitation of traffic, confined to peak periods.

SUMMARY OF THE INVENTION

The process for limiting traffic according to the invention consists in limiting the number of interrogations taken into account according to time statistic distribution criteria. This limitation consists in periodically comparing the number of interrogations issuing during an interval of time the duration of which is determined with a limit value, and in blocking the incident interrogations once this limit has been attained, up to the following comparison.

The device for applying the process of the invention comprises an AND input gate, receiving on one of its input pulses representative of the interrogations, the output of this gate being connected, on the one hand, to an authorizing output for taking into account the interrogations, and on the other hand, to a counter, the output of which is connected, on the one hand, to an adder further connected to a memory storing at least one criterion value, and on the other hand, to a first input of a comparator, the output of the adder being connected to a device for memorizing at least one reference value, the output of which is connected to a second input of the said comparator, the output of this comparator being connected via a memorizing device to a second input of the said AND gate.

BRIEF DESCRIPTION OF THE DRAWINGS

The present invention will become more apparent from reading the detailed description of several embodiments, given with reference to non-limitative examples, and illustrated by the appended drawings, in which:

FIG. 1 is a block diagram of a traffic limitation device according to the invention;

FIGS. 2 to 5 are block diagrams of improved embodiments of the device represented in FIG. 1; and FIG. 6 is a block diagram of a variant of the device represented in FIG. 1.

DESCRIPTION OF THE PREFERRED EMBODIMENT

The traffic limitation device represented in FIG. 1 receives on its input terminal 1 pulses each corresponding to an interrogation arriving at a transponder (not represented) in which is housed the device according to the invention. This transponder forms part of an interrogation/response system such as a secondary radar or IFF system. The terminal 1 is connected to a first input of an AND gate referenced 2. The output of the gate 2 is connected to an output gate 3 and to the counting input of a counter 4. On the terminal 3 appear validation signals produced by the device according to the invention, in a manner explained herein-below, these signals authorizing the transponder to accept the requests of the interrogating stations concerned. It is, however, well understood, that it is also possible to produce on the terminal 3 an inhibition signal, by inserting an inverter immediate upstream.

The output of the counter 4 is connected, on the one hand, to a first input of an adder 5, and on the other hand, to a first input of a comparator 6. The second input of the adder 5 is connected to the output of a memory circuit 7, which can be, in the most simple case, a register. This circuit 7 contains at least one value $K_T$, or criterion, representing the maximum number of incident pulses (on the terminal 1) authorized during any given time interval Ti of duration T. The output of adder 5 is connected to a memory circuit 8 memorizing at least one reference value $V_c$. In the most simple example, the circuit 8 can be a register. The output of the circuit 8 is connected to the second input of the comparator 6.

The output of the circuit 6 is connected to a memory circuit 9. In the most simple example, the circuit 9 is a flip-flop. The inverted output of the circuit 9 is connected to the second input of the gate 2.

As an example, a current time interval Ti may be selected and Ni is the number of pulses arriving at the input 1 during this time interval. Two situations may arise:

a. $Ni \leq K_T$: the pulses Ni must be integrally transmitted to the output 3;

b. $Ni > K_T$: the first $K_T$ pulses among the incident Ni pulses must arrive at the output 3, then no further pulse must reach the output 3 until the end of the interval Ti. This process is put to practice by the circuit described herein-above in the following way.

The incident pulses are transmitted to the output 3 while the gate 2 is not blocked. Each pulse thus transmitted increments the counter 4 by one unit. At the beginning of a period Ti, the counter 4 shows an initial value Nt, due to the preceding countings. Then the quantity $V_c = Nt + K_T$ obtained by adding through the circuit 5 the contents of the counter 4 and of the memory 7, is introduced into the memory 8. This quantity will act as order value until the end of the interval Ti.

During the remainder of the interval Ti, is compared in 6, with a periodicity t, the state of the counter 4 with the contents of the memory 8. If equality is reached, the output signal of the comparator 6 changes logic state. The memory 9 memorizes this event and sends a blocking signal to the gate 2.

The only condition required so that the counter 4 cannot exceed the order value is that the value t (periodicity of the comparison in 6) is chosen small enough so that only a single incident pulse may be produced. It is also possible to process the incident signal (immediately upstream of the input 1) by using a logic circuit allowing to mask all the pulses following on the first one in each period t. Such a circuit is obvious to realize for a man skilled in the art and will not be described in detail.

The circuit represented in FIG. 2 is an improvement over that shown in FIG. 1. In the circuit shown in FIG. 1, the results obtained can depend upon the original instant chosen for combing the time periods Ti. A time density peak of the incident pulses can be masked due to it being shared between two consecutive time intervals Tj, Tj+1. In order to prevent such a drawback, the embodiment represented in FIG. 2 is used. In FIG. 2, as with FIGS. 3 to 6, the elements identical to those represented in FIG. 1 bear the same numeral references. In the embodiment represented in FIG. 2, a memory 10 replaces the register 8 of the circuit of FIG. 1. This memory 10 comprises n memory elements (each one being equivalent to a register), with $n=T/t$. At each period ti, the state of the counter 4 is compared with the order signal VCi (i.e. one of the n order values $VC_O$ to $VC_{n-1}$ of the memory 10), corresponding to the element i. Thereafter, the contents of the element i is reactualized with the value $Ni+K_T$, Ni being the state of the counter 4 at the end of time ti. The n elements or addresses of the memory 10 are cyclically explored, and a single element m is examined according to a periodicity $nt=T$, which is indeed the reference time interval corresponding to $K_T$. The reference time intervals of the consecutive memory elements are shifted by t. In one embodiment, a RAM is utilized as memory 10, having a 64 8-bit bytes capacity.

The circuit of FIG. 3 represents a first generalization of that shown in FIG. 2 allowing to apply the function of the circuit of FIG. 2 for a plurality of reference time intervals T associated to a plurality of values $K_T$. In order to simplify the drawing and the explanations, the number of reference time intervals has been limited to two, i.e. T1 and T2, but it is well understood that a greater number may be utilized. At two these time intervals, are associated two values $K_T$, namely K1 and K2, with K2>K1.

The values K1 and K2 are memorized in a criteria memory 11. Due to the fact that it is necessary to store, in the present case, two sets of reference values corresponding to the two criteria (T1, k1) and (T2, K2) a memory 12 of greater reference values than before is used. This memory 12 comprises two memorizing units 13, 14 memorizing respectively the n1 and the n2 totals of the order values ($Vc'_o$ to $Vc'_{n1-1}$) and ($Vc''_o$ to $Vc''_{n2-1}$). Of course, these two memorization units are not necessarily distinct; a single memory circuit can be utilized the addressing of which is ordered so as to obtain, at any addressing, a reference value in each of the two value assemblies. The numbers n1 and n2 are such that $n1=T1/t$ and $n2=T2/t$. Given that such a case presents two operating situations, the output of the comparator 6 is connected to a memory 15 having two cases storing the results of comparison corresponding to these two situations. The inverted outputs of these two cases are each connected to an input of an AND gate 2A having three inputs replacing the gate 2. It is well understood that the logic operation performed by the gate 2A could be performed by any other variant or equivalent means without departing from the scope and spirit of the invention.

The circuit of FIG. 3 operates in time multiplexing, the two sets of reference values being alternately addressed. The elementary time t must be a common divider of T1 and T2. The number of memory elements required for the memory 12 is:

$$n=n1+n2=(T1+T2)/t$$

If one of the reference time intervals, for example T2, is much greater than the other (T1), the invention foresees that it is not necessary to reactualize as frequently the criterion order values (T2, K2) as those corresponding to the criteria (T1, K1). Therefore, the circuit represented in FIG. 4 is utilized, in which, with respect to that of FIG. 3, a memory 16 of reference values is used instead of the memory 12. In this memory 16, the capacity of the memorization unit corresponding to T2 is not increased in the same proportions as T2. By way of preferred embodiment, but without in any way limiting the same, $n1=T1/t$ and $n2=T2/T1$ have been chosen. The criteria tests (T1, K1) and (T2, K2) are carried out at each time interval t. With respect to the first memorization unit 17, relating to T1 (N1 reference values $Vc_0^1$ to $Vc_{n1-1}^1$), a single address (memory element) is tested and reactualized at the end of time T1, i.e. after each series of n1 elementary time t.

With respect to the memorization unit 18 containing the n2 order values relating to T2 (n2 values of $Vc_0^2$ to $Vc_{n2-1}^2$), each of the n2 memory elements is utilized according to the following cycle:
n1 readings in a given element with the period t;
writing in the element of the reactualized reference value;
passage to the following element.

The reactualization of such an element thus occurs with a periodicity of $n1 \times n2 \times t = T2$.

The counting by the counter 4 and the presentation of incident pulses on the output 3 are interrupted once any one of the order values in force is exceeded.

FIG. 5 represents the most general example of the circuit according to the invention. In a memory 19, are stored p criteria K1 to Kp. The reference value memory 20 comprises p memorization "pages" in each of which are stored the order values corresponding to each of the p criteria. The comparator 6 is followed by a memory 21 having p memory elements, each of which is connected to one of the p inputs of a NOR gate 22 the output of which is connected to the second input of the gate 2.

The variant of the circuit according to the invention represented in FIG. 6 differs from the other embodiments described herein-above by the fact the input of the memory 8 is only connected to the counter 4, the adder 5 being connected to the outputs of the memory 8 and of the memory 7. Thus, the memory 8 is actualized with the current value of the counter 4, the addition with the constant K1 which supplies the reference value $V_{ci}$ having occurred immediately prior to each comparison in the comparator 6. It is well understood that this variant can be utilized in any of the embodiments represented in FIGS. 1 to 5.

According to another aspect of the present invention, it is possible to utilize any one of the circuits described herein-above to control an automatic gain control circuit. Attaining one of the criteria is demonstrated by a change of the logic level at the output 23 of the comparator 6. A circuit supplying a voltage proportional to the frequency of attaining criteria could be utilized in order to provoke the control voltage of AGC. Such a circuit is well known to the man skilled in the art and will not be described in detail.

We claim:

1. A process for limiting data exchange in an interrogation/response system by determining the number of interrogations taken into consideration according to the following steps:

periodically comparing the number of interrogations issuing during a first predetermined time interval with a reference value number of interrogations;

blocking incident interrogations which exceed said predetermined value during said predetermined time interval until the end of said predetermined interval, wherein the step of periodically comparing the total number of interrogations includes the step of periodically comparing the number of interrogations issuing in time intervals of duration T, shifted with respect to one another by time $(t=T/n)$, with a single predetermined criteria of $K_T$ and further including the step of blocking the incident interrogations once this single criteria $K_T$ has been reached, until the next step of periodically comparing occurs during a subsequent one of said time intervals of duration T.

2. The process for limiting data exchange in an interrogation/response system by determining the number of interrogations taken into consideration according to the following steps:

periodically comparing the number of interrogations issuing during a first predetermined time interval with a reference value number of interrogations;

blocking incident interrogations which exceed said predetermined value during said predetermined time interval until the end of said predetermined interval, wherein the step of periodically comparing includes the step of periodically comparing the number of interrogations issuing during several time intervals of predetermined durations with several respective predetermined limit values and further including the step of blocking the interrogations once any of said predetermined limit values have been reached, until the respective one of said time intervals has expired.

3. An apparatus for limiting trafic in an interrogation/response system, said apparatus comprising:

an AND function input gate having one of its inputs fed with pulses corresponding to interrogations and wherein the output of said gate is connected to both an output for taking into account said interrogations and to an input of a counter wherein the output of said counter is connected to an adder and wherein said adder is connected to a memory with stores at least one threshold value, said counter being further connected to a first input of a comparator;

a second memory means containing at least one reference value wherein said second memory means in connected to the output of said adder and wherein the output of said memory means is connected to a second input of said comparator;

a third memory means connected to the output of said comparator and wherein the output of said memory means is connected to a second input of said AND gate.

4. The apparatus according to claim 3 wherein said third memory means comprises a plurality of memory elements wherein each of said plurality of memory elements is connected to a corresponding respective input of said AND gate.

5. The apparatus according to claim 3 wherein said third memory means comprises a plurality of memory elements with the output of each of said plurality of memory elements being connected to a NOR gate and wherein the output of said NOR gate is connected to an input of said AND gate.

6. The apparatus according to claim 3 wherein an output signal of said apparatus is a voltage complement of said authorization output and wherein said output provides an inhibit signal to a transponder.

7. The device according to claim 3 wherein the output signal of said comparator provides an automatic gain control voltage for a receiver of a transponder.

8. An apparatus for limiting traffic in an interrogation/response system, said apparatus comprising:

an AND function input gate wherein one of the inputs to said input gate receives pulses corresponding to interrogations of said system and wherein the output of said gate is connected to an output for taking into account the interrogations and to a counter;

a first memory means connected to the output of said counter wherein the output of said first memory means is connected to one input of an adder wherein a second input of said adder is connected to the output of a second memory means;

comparator means having one output connected to the output of said adder and a second input connected to the output of said counter;

third memory means connected to the output of said comparator wherein the output of said third memory means is connected to a second input of said AND gate.

* * * * *